Sept. 2, 1969     B. C. RAYNES ET AL     3,464,617
SWEAT SOLDER FORM
Filed June 9, 1965     2 Sheets-Sheet 1
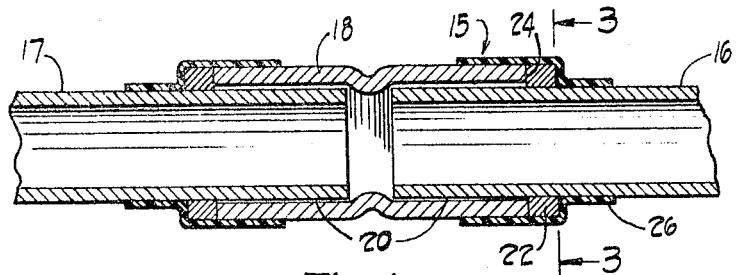
Fig. 1
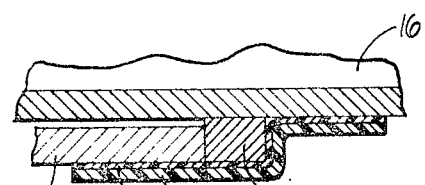
Fig. 2
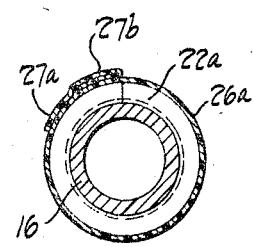
Fig. 3     Fig. 5
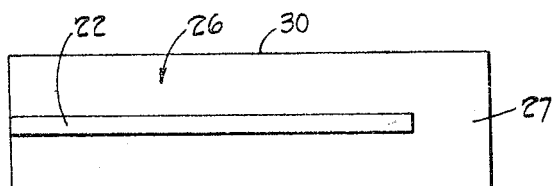
Fig. 4
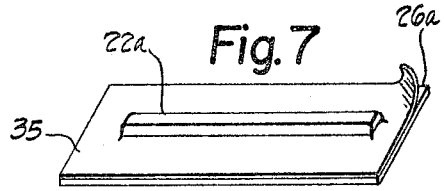
Fig. 7
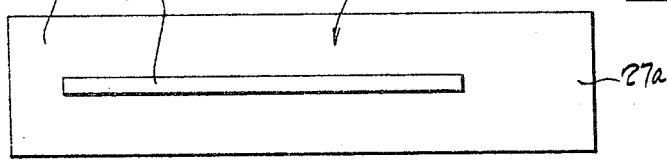
Fig. 6
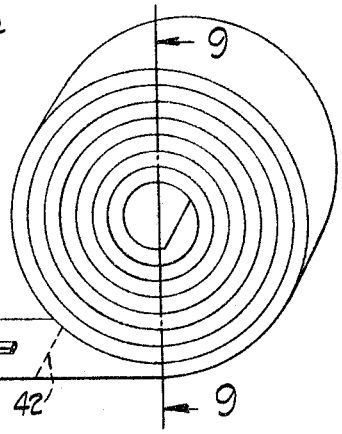
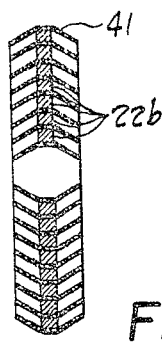
Fig. 9     Fig. 8
INVENTORS.
BERTRAM C. RAYNES
MICHAEL PESCATRICE
BY *Watts & Fisher*
ATTORNEYS.

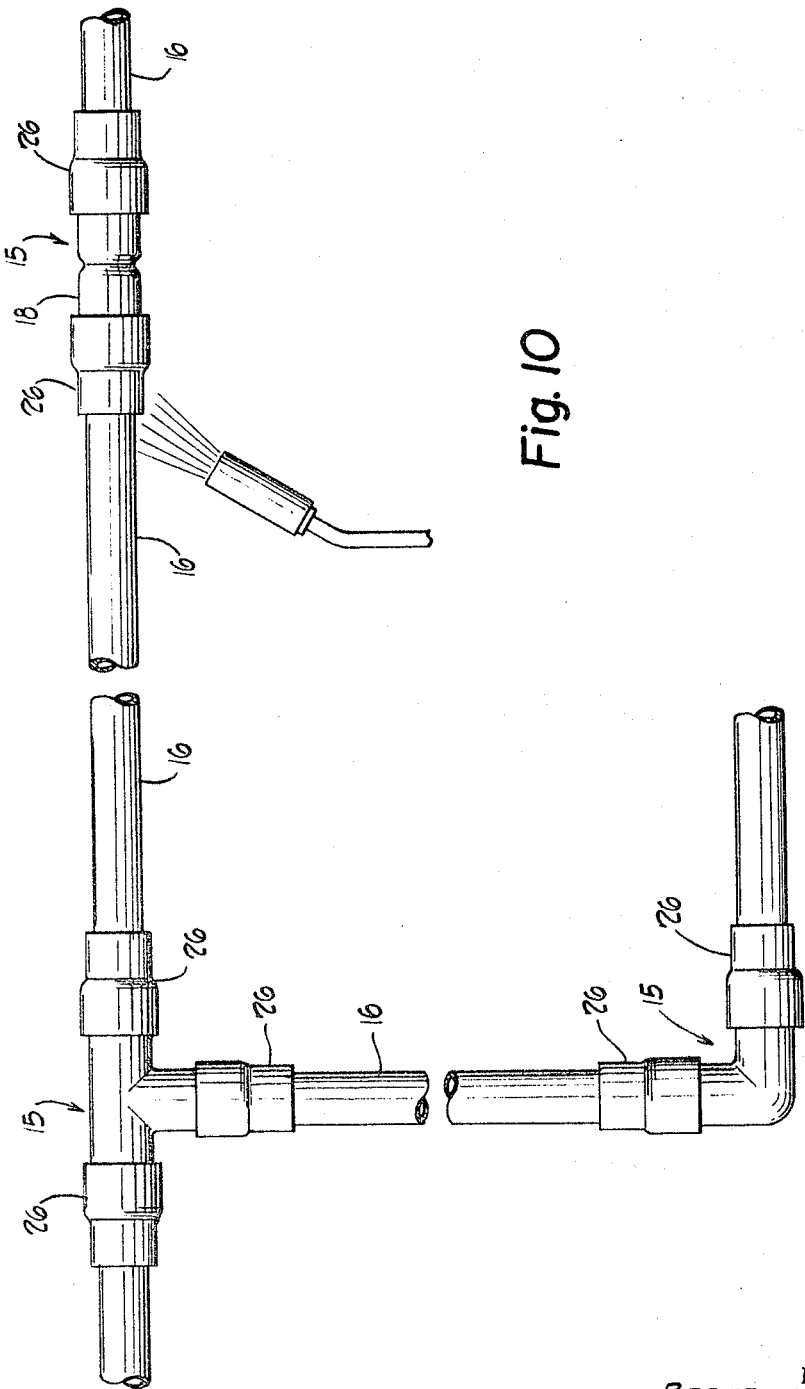

United States Patent Office 3,464,617
Patented Sept. 2, 1969

3,464,617
SWEAT SOLDER FORM
Bertram C. Raynes, Pepper Pike, and Michael Pescatrice, Lakewood, Ohio, assignors to Rand Development Corporation, Cleveland, Ohio
Filed June 9, 1965, Ser. No. 462,673
Int. Cl. B23k 3/06, 35/14
U.S. Cl. 228—56      12 Claims

ABSTRACT OF THE DISCLOSURE

A length of adhesive coated tape and a length of solder, narower and shorter than the length of tape, secured to the tape by the adhesive. The tape and solder are used in sweat soldering a pipe and fitting together by wrapping the two about the pipe so as to form the solder into an encircling ring around the pipe, directly abutting the fitting. Portions of the tape extending beyond the solder are adhered by the adhesive to the pipe and fitting to hold the parts in assembled relationship.

---

The present invention relates generally to mechanical connections and hermetic seals between two telescoped members, and relates more specifically to methods and articles for joining tubular members by a process commonly referred to as "sweat soldering."

Improved methods and apparatus for sweat soldering pipes and fittings are disclosed in the copending application of Theodore D. Jayne, Ser. No. 429,562, filed Feb. 1, 1965, now Patent No. 3,334,925, and assigned to the assignee of this application. The present invention is an improvement over the copending application and is particularly useful to home handymen or others who prefer the "do it yourself" approach to home building, repair or maintenance. The invention will also appeal to skilled plumbers because of the efficiencies and savings that can be attained through the use of this invention.

The "sweat soldering" process is widely used to join copper pipes or tubes and copper fittings which are slipped over end portions of the tube or over a portion of a fitting which is equivalent to a tube. Each fitting has a sleeve, or "solder cup" as it is sometimes termed, which telescopes over an end portion of the tube. Diametrical clearances between the telescoped tubular members, i.e., the sleeve and the tube, range from less than .002 inch to .009 inch or larger. A "sweat joint" is made by causing capillary flow of molten soft solder into the clearance space.

An approved procedure for preparing such sweat joints may consist of the following steps: (1) cut the tube end, ream, deburr, and size as is required; (2) clean the tube end and the solder cup, i.e., the sleeve, with steel wool or the like to obtain a bright metal surface; (3) sparingly apply solder flux to the tube and cup surfaces to be joined; (4) assemble; (5) gauge the proper amount of solder by bending over a length of solder wire, e.g., 50–50 soft solder, corresponding to the nominal size of the fitting; (6) heat the tube and fitting evenly and place solder at the joint and melt with the heat of the tube and fitting; (7) heat the fitting until the solder is absorbed; and, (8) remove the excess solder with a brush while the solder is plastic, leaving a fillet around the fitting end.

As disclosed in more detail in the aforementioned copending application, there are several phases in the soldering process by which solder is introduced into the sweat joints. The solder is melted through contact at the joint space with the pipe and fitting that have been wetted by flux and heated to soldering temperature. The solder melts, wets the joint and first forms a puddle, which builds into a bead as more solder is melted, and bridges the gap of the joint space to make "capillary contact." The liquid solder bridge enlarges as it is fed from the melting solder, moves into the joint space by capillary action and draws more molten solder with it. The free liquid surface of the solder is concave at the joint space and constitutes a driving meniscus. Thus, the liquid solder flows and fills the gap space to complete the sweat joint.

Most experts have for many years considered the formation of perfect sweat joints to be a simple matter. With relatively inexperienced persons this is by no means true. Relatively large size tubes and fittings of, for example four inches in diameter, have in recent years found increasing acceptance. With such large size couplings it is quite difficult for even skilled and experienced persons to make consistent and dependable joints in all situations.

Any number of imperfections in the listed phases of the soldering process may exist to produce defects in the complete sweat joint. For example, the solder movement into the joint may be limited by an inadequate supply of new liquid solder, inadequate solder entrance path into the joint gap, inadequate capillary forces, joint gap blockage, or inadequate flux.

Of particular interest here is the elimination, even with relatively unskilled persons, of those imperfections in the sweat joint which are the results of such factors as improper feeding of the holder to the joint, improper application of the heat to the pipe and fitting, and failure to maintain a desired gap by maintaining proper concentricity of the pipe and fitting. Most conventional methods of feeding the length of solder wire endwise into the gap, particularly hand feeding, are not able to assure a proper application of solder material completely around the joint at the proper moment during heating. Nor are they able to assure a continuous and unbroken feed to the joint gap. An uneven or discontinuous supply of the solder to the joint gap, as by the failure to melt the solder rapidly enough at the gap edge, does not suply the necessary reservoir of liquid solder.

Lack of concentricity, or more accurately, uneven spacing of the joint walls, provides a non-uniform capillary flow into the joint. If the gap becomes too big in areas, then the solder meniscus force is inadequate to provide an advance against gravity in combination with mild flow resistance from flux. This problem is especially acute in larger fittings, where the height to which solder must flow may be several inches. In these large fittings, the gap over large areas of the joint may allow solder to drain out of the joint rather than climb up into the upper portions of the joint.

Improper or uneven heating of the joint can also result in uneven or discontinuous solder flow. Untimely melting of the solder itself as by improper direct application of the heat source on the solder itself can produce uneven solder flow and even hinder formation of the driving meniscus.

An additional handicap of prior hand feeding methods is that they are unwieldy, particularly where the telescoped tubular members, the heat source, such as a torch, and the solder must all be hand held. This is especially a problem where the work is overhead since the continuous reaching up with both arms can become quite tiresome.

The present invention provides an improved method for applying the solder against a joint gap edge between two telescoping tubular members, such as a pipe and surrounding fitting. In addition, the improved method holds the pipe and fitting firmly in a pre-assembled position, so as to not only maintain a proper joint gap, but also to allow an entire length or run of pipe to be pre-assembled with fittings and placed in proper position, prior to sweat soldering the fittings.

Briefly, this method involves wrapping a length of pressure sensitive tape, with an adhered length of solder of proper volume for the joint, around the tube or pipe directly adjacent the joint, with the solder abutting the end of the fitting, and heating the assembly to melt the solder.

The sweat soldering of pipes and fittings in accordance with this invention is preferably accomplished by using a novel combination and arrangement of predetermined lengths of solder adhered to predetermined lengths of pressure sensitive adhesive tape. Each length of solder is predetermined to correspond to the outside circumferential length of a standard sized pipe. The length of solder is sufficiently large in cross section to provide a volume of solder sufficient to properly fill the joint gap between the pipe and surrounding fitting after the solder has been melted and has flowed between the two by capillary action. Preferably, the length of pressure sensitive adhesive tape is somewhat longer than the length of solder, although it is satisfactory if it merely corresponds in length. The solder is located in longitudinal alignment with the tape, intermediate the longitudinally extending edges of the length of tape. This preferred construction and arrangement provides an overlapping or extending portion of the tape that holds the solder and parts in place.

When a pre-assembled length of tape and solder is used to join a pipe and fitting, the length of tape is first positioned with the solder adjacent the fitting, and is wrapped about the pipe so as to form the solder into an encircling ring around the pipe and directly abutting the terminal end of the fitting at the joint gap. Portions of the tape that extend axially of the pipe and fitting at each side of the solder ring are pressed into tight surface contact with the pipe and fitting about the circumference of each. Heat is then applied to the fitting and tube preferably on either side of the tape, thereby causing the solder to melt and flow into the joint gap. The very presence of the tape itself tends to cause the worker to apply heat on each side of the joint, as he should, rather than directly to the gap and solder.

In a preferred embodiment, the pressure sensitive adhesive tape of the present invention is transparent so that the joint may be visually observed during soldering. It is also preferred that the tape undergo a visible change, such as a change in color, upon the application of heat sufficient to melt the solder, thereby indicating that the joint has been soldered. In this way, where a large number of joints are first taped and thereafter heated and soldered, it will be readily apparent to a workman or an inspector whether or not any taped joint has been left unsoldered.

Additionally, the tape should be non-combustible at the temperatures to which it is heated during the soldering operation, even when subjected to the direct flame of a soldering torch, for safety and so that the pipe and fitting are maintained in proper relationship throughout the soldering operation. The tape may be of a material that shrinks when heated, thereby firmly closing in behind the solder as the solder melts and runs into the gap.

It is contemplated that lengths of tape and adhered solder strips may be pre-cut to standard pipe sizes. Preferably strips of solder may be pre-cut and adhered in proper spaced relationship to a continuous tape or sheet of tape-like material that is perforated or marked to define separate tapes. For example, an elongated tape is scored across the width of the tape at spaced locations, each score defining the end of each length, and the tape may be formed into a roll. Where separate, pre-cut strips or a sheet of scored strips are provided, the adhesive side of the tape is preferably protected by a thin, smooth, protective strip.

The present invention results in considerable savings of solder by adhering the proper amount for each joint directly to the tape. Experience has shown that in hand feeding solder to a joint there is a tendency to utilize an excess of solder over that necessary. This feature therefore makes the present invention attractive to contractors who fabricate large installations where the waste becomes substantial, as well as to others of more limited skill to whom it assures a proper joint. Furthermore, substantially increased efficiencies can be obtained if a piping system can be first assembled and thereafter soldered. With the present invention, parts may be held by the tape in a pre-assembled arrangement and then subsequently soldered, permitting substantial savings in time.

Other attendant advantages of this invention and the various embodiments thereof will be readily appreciated as the invention becomes better understood by reference to the following detailed description when considered in connection with the accompanying drawings in which:

FIGURE 1 is a longitudinal sectional view of a pipe and fitting wrapped and held in position ready to be soldered, in accordance with the present invention;

FIGURE 2 is an enlarged, fragmentary, view of the joint gap, solder and tape of FIGURE 1;

FIGURE 3 is a transverse sectional view of the assembly of FIGURE 1, taken along the line 3—3, and looking in the direction of the arrows;

FIGURE 4 is a plan view of a length of tape and adhered solder as it appears in a pre-cut form prior to being applied to a pipe joint as in FIGURE 3;

FIGURE 5 is a transverse sectional view of a pipe and fitting wrapped with a length of tape and solder, similar to that shown in FIGURE 3, but depicting another embodiment wherein the tape extends beyond the length of solder at each end and is sealed by joining the two ends of the tape and then folding the ends in one direction around the pipe;

FIGURE 6 is a plan view of a pre-cut length of tape and solder, with the solder arranged on the tape in a manner to facilitate wrapping the tape as shown in FIGURE 5;

FIGURE 7 is a perspective view of a pre-cut length of tape and adhered length of solder material, whene an adhesive surface of the tape is covered by a protective covering;

FIGURE 8 is a side elevational view of a roll of pre-scored tape to which separate, spaced, lengths of solder are adhered;

FIGURE 9 is a transverse sectional view of the roll of tape shown in FIGURE 8, taken along the line 9—9 and looking in the direction of the arrows; and FIGURE 10 is a diagrammatic showing of a pipe system pre-assembled and taped prior to soldering.

Referring now to FIGURE 1, a plumbing assembly having joints to be soldered in accordance with the present invention is indicated generally by the reference character 15. The plumbing joint includes tubes or pipes 16, 17 of copper or other suitable metal, and a sleeve or fitting 18 of copper or other metal. The copper pipes 16, 17 and the copper fitting 18 in the form of a sleeve are all conventional in plumbing pieces.

The copper pipe 16 is shown telescoped into one end of the sleeve 18, and the pipe 17 is shown telescoped into the opposite end of the sleeve 18. A joint gap or space 20 is formed between each pipe 16, 17 and the copper sleeve 18. Because the relationship between each pipe 16 and 17 with the sleeve 18 is essentially the same, only the relationship between the pipe 16 and sleeve 18 and the associated solder assembly will be described in detail.

As shown in FIGURES 1, 2 and 3, a relatively narrow length of sloder material 22 is wrapped to form a split ring directly surrounding the pipe 16 and abutting the terminal end 24 of the fitting 18. It will be understood, of course, that suitable flux (not shown) is applied to the pipe 16 within the joint gap 20.

A length of flexible tape 26 having an adhesive surface or layer 28 (see FIGURE 2) enwraps the outside circumference of portions of both the pipe 16 and the sleeve 18, as well as the solder 22. The tape is shown in intimate, adhering, contact about the circumference of the pipe 16, fitting 18, and solder 22.

As best shown in FIGURES 1 and 2, the width of the flexible tape 26 extends axially along the pipe 16 and fitting 18 a distance sufficient to contact adequate surface of both the fitting and the pipe to firmly hold the two together in their predisposed position prior to soldering. In the embodiment of FIGURE 4, one end of the length of solder is located adjacent one end of the tape and extends along the tape intermediate the two longitudinally extending edges 29, 30. The length of tape 26 exceeds the length of the solder 22 so as to provide an overlapping portion shown at 27 that provides further assurance of a firm, tight, connection between the pipe and fitting prior to soldering.

Because both the flexible tape 26 and the solder material 22 may be readily curved to the desired contour, a substantially flat, pre-cut length of tape and solder, as shown in FIGURE 4 of the drawings, may be quickly wrapped around the pipe 16 and fitting 18 and pressed into place to form the assembly shown in FIGURES 1, 2 and 3.

The body of solder material 22 may be of any conventional soldering material, for example, a 50–50 solder which is 50% lead and 50% tin, or 95–5 tin-antimony alloy. The solder material may also comprise a silver solder, as the present invention is also usable for silver soldering.

FIGURES 5 and 6 illustrate a second embodiment of a pre-cut length of tape with an adhered length of solder. A strip of solder 22a is located with both ends spaced from adjacent ends of the tape. However, the strip is positioned closer to one end of the tape than the other. It is also spaced intermediate the two longitudinally extending edges of the length of tape, as in the embodiment of FIGURE 4. Thus, in this case, there are two extending flaps 27a and 27b. The flap 27a is somewhat longer than 27b. With this arrangement, as shown in FIGURE 5, the length of solder 22a is wrapped about the outer circumference of the pipe 16 until the two ends of the solder abut each other. The flaps of 27a and 27b are pressed together and then folded about the pipe 17 and fitting 18, with the extra length of flap 27a being adhered about the outside of the already wrapped tape, thereby securing the tape tightly about the joint.

Pre-cut length of pressure sensitive tape having the proper length and quantity of solder already attached may be conveniently supplied in the form shown in FIGURE 7 of the drawings. As shown, the tape 26a and length of solder 22a of the embodiment of FIGURE 6 is covered with a flexible protective film 35, which is in direct contact with the adhesive surface of the tape 26a. The flexible protective sheet 35 is suitably constructed so that it does not firmly adhere to the adhesive surface of the tape 26a, and it can therefore be readily removed when the tape and solder are to be applied to the joint. A waxed or plastic coated paper provides a suitable protective sheet.

As a preferred alternative to pre-cut lengths of tape, a roll of tape 40, is shown in FIGURES 8 and 9 of the drawings. The roll 40 is made of a continuous strip of pressure sensitive, adhesive, flexible tape 41. Desired lengths are delineated by spaced indicia 42. These indicia 42 may be pre-scored lines, or simply printing, but are preferably perforations as shown. Lengths of solder 22b are adhered to the adhesive surface of the strip of tape 41 in proper position with relationship to the pre-scored lines 42, so as to form separate strips as shown in FIGURE 4 or FIGURE 6 of the drawings, when the tape is torn along the perforated or pre-scored lines 42. With this arrangement, a protective film over the adhesive surface is not required, inasmuch as the rolled configuration protects the adhesive surface, as illustrated in FIGURE 9.

In a preferred form of the present invention, the tape 26 is essentially transparent, non-combustible at the temperatures at which the sweat soldering is accomplished, and undergoes a visible change, i.e., becomes visibly scorched or changes color, when the pipe 16 and fitting 18 are heated to a temperature sufficient to melt the solder 22. The color change may occur because of the composition and properties of the tape itself or may be achieved or enhanced by incorporating into the tape or applying to the tape any of the known waxes, compounds or paints that change color when a certain temperature range is reached. Ideally, the tape will also shrink upon heating to close in the space previously occupied by the ring of solder prior to heating, thereby maintaining the original tightness. Suitable tapes include those made from fluorocarbon resins, or vinylidene chlorides. Advantageously, the tapes may be reinforced by fiberglass for strength and to resist stretching, thereby being better suited to maintain the wrapped parts in proper position with uniform spacing between the pipe and fitting. The tape is coated with a suitable pressure sensitive adhesive, for example, a silicone adhesive.

It will be apparent from the above description, that in accordance with this invention, the tape holds the tubes 16 and 17 in the fitting or sleeve 18, and, additionally, holds the solder material 22 in direct contact with the pipes 16, 17 at the opening of the joint gap 20. As shown in FIGURE 10, a number of fittings or an entire system or portion of a system have been pre-assembled and held in proper relationship and position with the tape prior to heating and soldering. To solder a taped joint, a source of heat, such as a torch, is provided and applied to the pipe and sleeve on either side of the tape so that the joint area is properly heated and the solder is melted by the heat of the two members being soldered. With the pipes 16, 17 properly centered initially within the fitting or sleeve 18, the tape 26 surrounding the fitting and pipe at each joint gap 20 and extending beyond the gap so as to encircle both the pipe and the fitting in tight, adhering relationship, will hold the sleeve and the telescoped tubes in assembled, uniformly spaced, relationship. Thus, the tube and sleeve need not be held by hand while being soldered. Furthermore, the tape shields the solder material from the direct application of heat and also from entry of gases and other materials during the sweat soldering process.

When the joint area is heated to the soldering temperature, each body of solder material in contact with the tubes 16, 17 adjacent each end of the sleeve 18 immediately melts and wets the joint edges to form a solder bridge and a driving meniscus. The melting solder flows into each joint space 20 by capillary action and fills the joint space. The tape is sufficiently transparent for the operator to see the solder flow and stop the application of heat. Once the joint is completed the appearance of the tape readily indicates the fact that it has been heated and therefore that the joint has been soldered. The length of tape may be either left in place or removed after the joint is soldered.

The significance of maintaining the pipe and fitting in proper, pre-aligned and essentially concentric relationship during the soldering operation will be readily appreciated from the fact that a uniform gap about the entire circumference of the joint will draw melted solder uniformly into the joint, whereas if the gap is too large in places, so as to exceed the maximum permissible capillary dimension between the pipe and fitting, the solder will not flow sufficiently into the gap. On the other hand, if the pipes are in contact, there will be little or no solder to form a seal at the line of contact.

The spacing is, of course, more critical in large diameter pipes, inasmuch as the solder must flow a substantially greater distance to provide a complete and adequate seal. By way of example, in a four inch copper pipe to be sweat soldered to a copper fitting, the maximum permissible capillary dimension between the pipe and the fitting which will draw the melted solder a distance of four inches from the opening from which the solder is applied, is approximately 0.004 inch. Thus, if the gap dimension is greater than 0.004 inch it is probable that the solder will not be drawn entirely up and around the entire circumference of the telescoped portions of the copper pipe.

In summary, the present invention uniformly provides a proper supply of solder material circumferentially of the joint gap and touching the edge of the fitting at the joint gap entrance. That is, for a given length of solder material adhered to a predetermined length of tape, the width and thickness of the solder material is correlated to provide a volume of solder that will adequately fill the gap joint when the solder is melted and drawn by capillary action into the joint gap. With the arrangement of the present invention, the solder melts annularly due to the heat from the pipe and fitting and uniformly provides a continuous circumferential supply of liquid solder to the joint gap entrance. The pressure sensitive adhesive tape holds the fitting and each tube, in a predisposed relationship so that, if positioned initially, the pipes will be properly positioned during the soldering process. Thus, an even flow and uniform advancement of the liquid solder into the joint space is obtained.

Although the invention has been described in preferred forms with a certain degree of particularity, it should be understood that the present disclosure of the preferred forms has been made only by way of example and that numerous changes and the details of construction and the combination and arrangement of parts may be resorted without departing from the spirit and scope of the invention as hereinafter claimed.

What is claimed is:

1. An article of manufacture for use in assembling pipes and fittings or the like comprising a length of tape having an adhesive coating on one surface, said tape being of a predetermined width, and a length of solder material shorter than the length of tape and narrower than the width of the tape, adhered to the adhesive coating; said length of solder extending along the tape in general longitudinal alignment therewith and said adhesive coating extending beyond the width and length of the solder material whereby the tape will adhere to a pipe and fitting, hold the solder in place and maintain the pipe and fitting in assembled relationship.

2. The articles of claim 1 wherein the length of solder material extends along the tape intermediate longitudinally extending edges of the tape.

3. The article of claim 2 wherein the length of solder material is adhered to the adhesive coating of the length of tape with one end of the length of solder material located at one end of the length of tape.

4. The article of claim 2 wherein the length of solder material is adhered to the adhesive coating of the length of tape with both ends of the length of solder material spaced inwardly from both ends of the tape.

5. The article of claim 1 wherein the length of the solder essentially corresponds with the outside circumferential length of said pipe to be sweat soldered.

6. The article of claim 5 wherein the solder material constitutes a predetermined volume sufficient to essentially fill an annular joint between the tube and surrounding fitting when the solder material is melted.

7. The article of claim 1 wherein the tape is comprised of a material that shrinks when heated to a temperature at which the solder material melts.

8. The article of claim 1 wherein the tape includes a material that undergoes a visually observable change when heated to a temperature at which the solder material melts.

9. The article of claim 1 wherein the tape is transparent.

10. The article of claim 1 wherein the tape is noncombustible at temperatures sufficient to melt the solder material.

11. A combination of tape and solder which comprises a strip of tape of predetermined width, one surface of which is coated with a pressure sensitive adhesive; said tape including length delineating means at locations spaced along the length of the strip of tape; a plurality of strips of solder narrower in width than the width of the tape and shorter in length than the distance between successively spaced delineating means, said strips being adhered to the tape by the pressure sensitive adhesive and extending along the tape between successive delineating means and intermediate longitudinally extending edges of the tape, and said adhesive coating extending beyond the width and length of the solder strips.

12. An article for use in sweat soldering fittings and pipes, which comprises: a strip of tape that is noncombustible at soldering temperatures, essentially transparent and heat shrinkable, and that undergoes a visible change when heated to soldering temperatures; an adhesive coating covering one surface of the tape, suitable for adhering the tape to a pipe and fitting or the like; and a strip of solder material adhered to the tape by the adhesive at a location spaced from edges of the tape so that said adhesive coating extends beyond the width and length of the solder material; whereby the tape will adhere to a pipe and fitting, hold the solder in place and maintain the pipe and fitting in assembled relationship.

References Cited

UNITED STATES PATENTS

| | | | |
|---|---|---|---|
| 1,698,360 | 1/1929 | Day | 29—500 |
| 2,963,538 | 12/1960 | Dahlgren | 174—117.5 |
| 3,029,303 | 4/1962 | Severino | 174—117.6 |
| 3,040,686 | 6/1962 | Buskirk | 228—56 |
| 3,132,204 | 5/1964 | Giellerup | 174—117.6 |
| 3,168,617 | 2/1965 | Richter | 174—68.5 |
| 3,179,552 | 4/1965 | Hauser | 117—122 |
| 3,231,419 | 1/1966 | Korpman | 117—122 |
| 3,239,125 | 3/1966 | Sherlock | 228—59 |

JOHN F. CAMPBELL, Primary Examiner

J. L. CLINE, Assistant Examiner

U.S. Cl. X.R.

29—500